May 2, 1961 A. C. PETERSON 2,982,094
GAS TURBINE AND JET MEANS
Filed Aug. 8, 1955 3 Sheets-Sheet 2
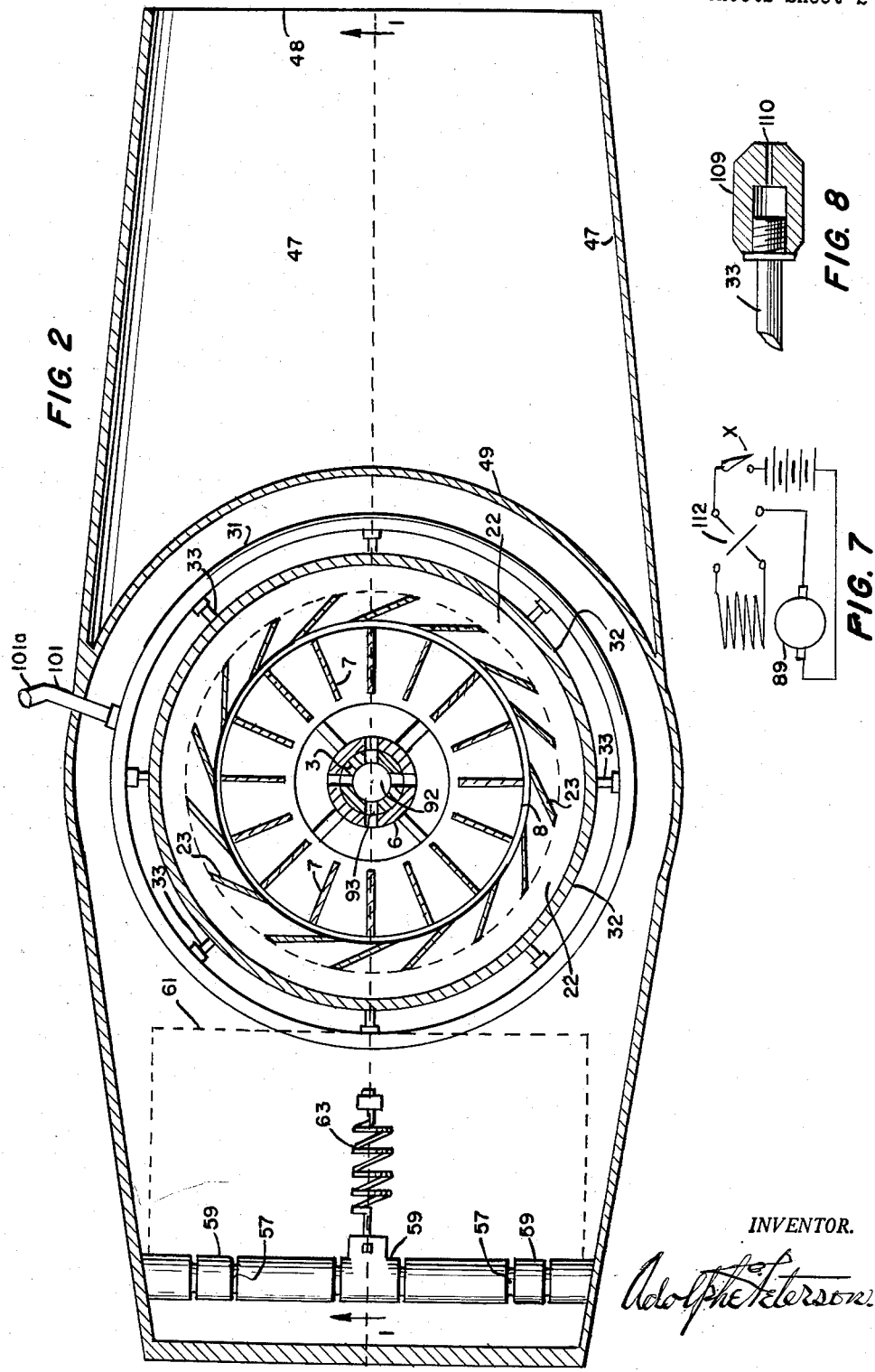
INVENTOR.
Adolphe Peterson

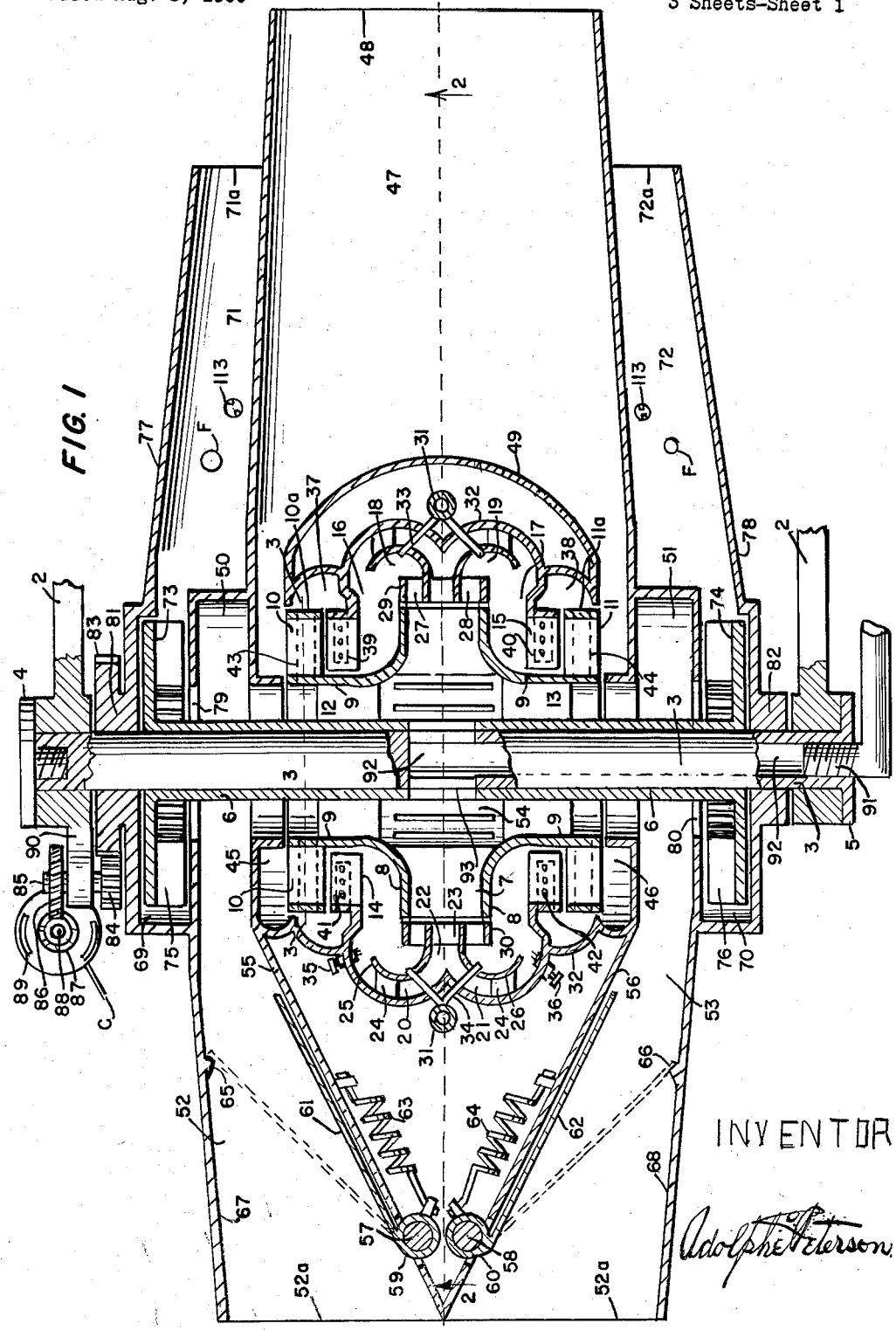

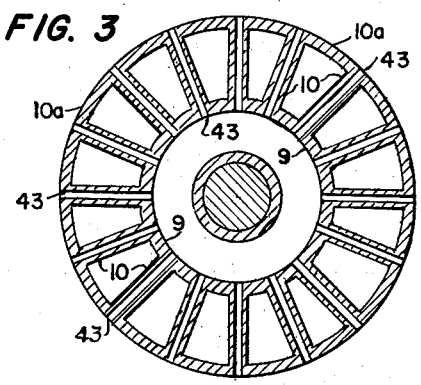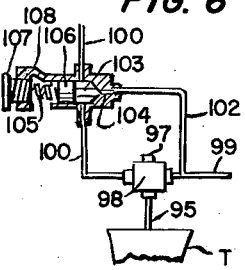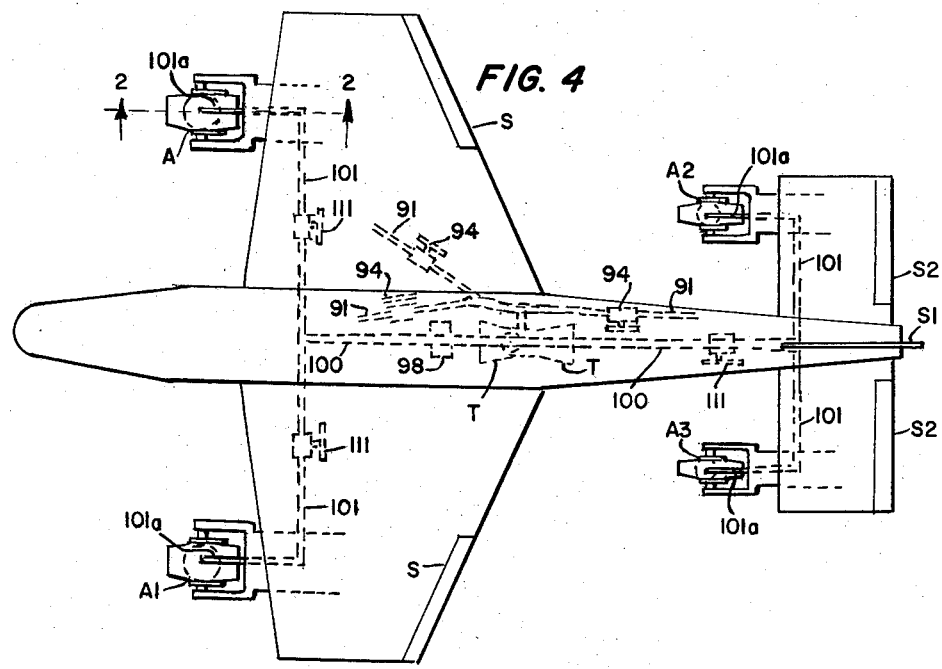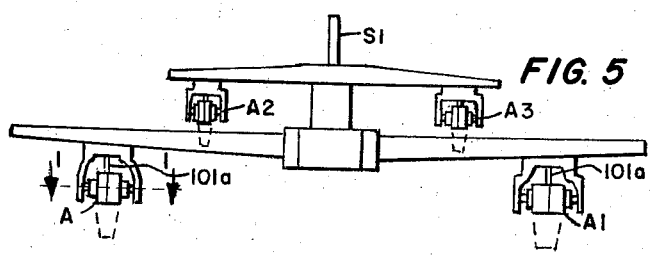

United States Patent Office 2,982,094
Patented May 2, 1961

2,982,094

GAS TURBINE AND JET MEANS

Adolphe C. Peterson, 4623 Bruce Ave. S., Minneapolis 24, Minn.

Filed Aug. 8, 1955, Ser. No. 526,883

3 Claims. (Cl. 60—35.55)

My invention relates to gas turbines and particularly to a form of gas turbine, which has special advantages in itself, and which also has an especial adaptation to and use as a jet engine, and it is therefore called Gas Turbine and Jet Means.

The chief objects of my invention are to provide a form of gas turbine which is relatively simple in construction, which is durable in use, which is relatively short in its rotor construction and accordingly of relatively light weight, which in its compressor construction is relatively simple and easily constructed, which may for jet use be of relatively small frontal cross sectional area, and which, owing to its form of construction and relation of parts, has ability to use higher temperatures of gas and accordingly will have a relatively high efficiency in use as a gas turbine. Another chief object is to provide a gas turbine which in conjunction with a jet discharge for propulsion or thrust, has the advantage of providing for change of direction of thrust in several directions so that the thrust of the jet means may be used not only for propulsion of a vehicle as an airplane, but so that the jet means may also be used for vertical upward thrust to produce sustentation of an aircraft in slow translational movement or hovering, and so that this jet thrust may also if that be desired be used for braking or quick stopping of the forward horizontal movement of an aircraft on which it may be mounted. Turbines such as are in use are not adaptable to braking or quick stopping of an aircraft, except with the addition of complicated means, and a means for this purpose is desirable for aircraft. Likewise turbines such as are commonly used are not readily adaptable for vertical downward thrust of the jet means without much complicated apparatus and much additional weight. It is an object of this present invention to provide a form of gas turbine which inherently, because of its form and method of operation, is especially suitable to provide change of direction of thrust, so that the gas turbine and its jet thrust is available not only for translational propulsion of an aircraft, but so that it is available also for sustentation thrust vertically downward, and so that also if it is desired, it is available for braking of an aircraft after the aircraft has landed on an airport. In general the object is to provide an improved form of gas turbine having special efficiency, and also to provide a form of gas turbine which has the advantage, with simplicity in construction, of ability for change of direction of jet thrust.

The principal devices and combinations of devices, comprising my invention, are as hereinafter described and as defined in the appended claims. In the accompanying drawings which illustrate my invention, like characters refer to like parts throughout the several views.

Referring to the drawings:

Figure 1 is a view chiefly in horizontal section, through the axis of the principal operating means, and also through the axis of the means which provides for change of direction of thrust, and this section is on a plane on the line 1—1 of Figure 2, some parts being in full elevation and some parts broken away, notably the supporting structure for the turbine. Figure 2 is a vertical section on a plane at right angles to the axis of the rotor of the turbine and longitudinally through the jet means or tube, this section being on the line 2—2 of Figure 1, some parts broken away. Figure 3 is a section transversely through one turbine rotor and turbine blades, through one of the tubes 9, to show the construction of the internal cooling channels of the blades, this construction being that of the turbine rotor blades and other tube 9 around which hot gasses pass in operation. Stator blades have like channels in the blades, but not with the tubes 9. Figure 4 is a diagrammatic sketch of an aircraft on which four of my turbine units are shown as mounted thereon, this sketch showing also the method of supply of fuel and also the method of supply of starting air for the turbine units. Figure 5 is a front elevation view of this aircraft. Figure 6 shows fuel supply means. Figure 7 shows current control, and, Figure 8 shows a fuel metering nozzle.

The turbine structure and the jet structure are supported by a pair of bearing brackets which, more fully shown in Figures 4 and 5, are a part of a support frame structure 1, and are each denoted as 2. This bearing structure has one bearing bracket 2, located on each of the opposite sides of the turbine unit, and there is a static support shaft 3 which is placed horizontally in the support brackets and is fixed at one end to one bearing bracket 2 and at the opposite end is fixed in the bearing bracket 2, on that opposite side. The support shaft 3 is fixed so that it does not rotate and is securely held in its place in the support brackets by the cap screw 4, at one end and the cap flange 5 formed on the shaft 3, at the opposite end. The support shaft 3, throughout all its length from the interior side of one bearing bracket to the interior side of the other, is round in shape and forms an axis on which two units may rotate, one—the turbine rotor unit, and two—the jet casing. These are rotatable or oscillative on the same co-incidental axis, this axis being a horizontal axis and being placed transversely of the direction of propulsion of gases from the jet means, so that both the said units will be rotatable or oscillative in the vertical plane longitudinally of the aircraft and of the direction of forward thrust in translational flight or propulsion, the turbine rotor being rotatable and the jet casing being merely oscillative through a major portion of a circle.

The turbine rotor unit will be first described. This unit has a tubular shaft 6 which is the element on which all rotatable elements of the turbine are mounted, and this tubular shaft is nearly the length of the distance from one bearing bracket 2 to the other, intermediately thereof, and this turbine shaft 6 is of an internal size of bore, such that it may rotate very freely on the support shaft 3 as a bearing for the tubular shaft 6. Intermediately of the axial length of the tubular shaft 6 there are mounted thereon, annularly thereof, the centrifugal compressor blades 7, these being formed generally as blades in such compressors are, and these compressor blades 7 are formed integrally with or are affixed in any manner, as by welding, to the pair of rotor disks 8 which are concentric with the tubular shaft 6. The disks 8 are formed with axially extending comparatively large tubes 9 of which one extends laterally and axially away from the disks 8 on one side thereof and the other extends laterally and axially away from the disks 8 on the opposite side thereof, so that each of these tubes 9 forms a mounting for turbine blades, one set thereof 10 being mounted annularly and exteriorly of one of the tubes 9 and the other set thereof 11 being mounted annularly and exteriorly of the other of the tubes 9, so that there is thereby formed a turbine, also denoted 10, at one lateral side of the compressor unit, and there is also formed a turbine, also denoted 11, at the other lateral side of the compressor unit. The tubes 9 are rigidly mounted on the tubular shaft 6 by means of one set of so-called blade-ribs 12, at one end between the tubular shaft 6 and the tube 9, and another set of so-called blade-ribs 13, at the other end between the tubular shaft 6 and the tube 9. The compressor blades 7, and the two sets of turbine blades 10 and 11, are thus all firmly mounted on the tubular shaft 6 so that the compressor blades 7 and the turbines 10 and 11 will thus be rotatable as a unit, and the turbines 10 and 11 will rotatively drive the compressor blades 7 in their rotative operation.

At one lateral side of the axial intermediate center, of the rotor unit, there is a set of stator blades or nozzle guide blades 14, and at the other side of the axial intermediate center, of the rotor unit, there is another set of stator or nozzle guide blades 15. One of these sets is intermediately between the compressor unit and one turbine 10 and the other of these sets of nozzle guide blades is intermediately between the compressor unit and the other turbine 11, there being an annular channel 16 at one side of the compressor unit and an annular channel 17 at the other side of the compressor unit, these channels 16 and 17, respectively, forming conduit means to conduct combustion gases from the one annular combustion chamber 18 to one turbine, and from the other annular combustion chamber 19 to the other turbine.

Exteriorly of the combustion chambers 18 and 19, there are formed annular air chambers or conduits 20 and 21, respectively and both of these connect with the one annular conduit 22 wherein there are disposed compression guide vanes 23 which receive air under compression from the compressor blades 7, these compression guide vanes 23 being formed as such vanes are usually formed in compressors or even being omitted in any construction if that be desired, for simplicity in construction. Guide ribs 24 rigidly mount the annular walls 25, 26, which are between the combustion chambers and the air conduits 20 and 21, but they do not interfere with passage of the air to the channels 16 and 17, so that this air, which is cooling air, may unite with the combustion gases from the combustion chambers in the channels 16 and 17. One annular set of compression guide vanes 27 at one lateral side of the guide vanes 23, and another set of compression guide vanes 28, at the other side of the compression guide vanes 23, are as usual in compressors adapted to receive compressed air from the compressor blades 7 and to assist in the compression of the air and discharge it in annularly circulating method to the annular combustion chambers 18 and 19, respectively. Annular walls 29 and 30 serve to support the guide blades and also to direct the air as compressed into the combustion chambers 18, 19, respectively. An annular fuel common conduit 31 annularly and exteriorly of the casing 32, serves to conduct fuel, pumped as hereinafter described, to the multiple number of fuel nozzles, one set of which 33 discharges fuel at multiple annular locations to one combustion chamber, and the other set of which 34 discharges fuel at multiple annular locations to the other combustion chamber. Spark plugs 35, 36, in each combustion chamber serve for ignition.

The casing 32 is annularly of the turbine rotor means and the compressor means, which has been described, and encloses these chambers and serves also to secure the stator guide blades in place. This casing 32 has also formed in it, laterally exteriorly of the annular chambers described, one annular chamber 37, at one side, and another annular chamber 38, at the other side. One is formed annularly and exteriorly of the one turbine 10, and the other is formed annularly and exteriorly of the other turbine 11. One annular chamber 37 is extended over and around the one set of stator blades or nozzle guide blades 14 and the other is extended over and around the other set of nozzle guide blades 15, each being thereby in connection with and open to the open outer ends of cooling air conduits denoted 39 and 40, respectively in the nozzle guide blades. These air conduits 39, and 40 discharge the cooling air by means of a number of small apertures 41, 42, which discharge the air into the passing stream of combustion gases exteriorly of the nozzle guide blades, so that this cooling air will mix with the combustion gases and pass with the combustion gases to the turbines. The apertures may be formed in such manner as to not hinder the passing stream but rather to enhance the force and velocity of the gas stream.

The annular air chambers 37 and 38, receive the cooling air, one from the one set of turbine blades, and the other from the other set of turbine blades, these turbine blades 10 and 11 having air conduits 43, 44, respectively formed in them and passing radially of the turbine rotor through the blades and so that, each turbine blade will receive a small quantity of cooling air from interiorly of the associated tube 9 and discharge that air, after compressing it by centrifugal force, through the thus apertured annular members 10a and 11a of the turbine rotors, to the annular chambers 37, 38, from which chambers the cooling air under the compression, as acquired will pass in very small streams through the conduits of each nozzle guide blade to the apertures 41, or 42, and to the gas stream going to the turbines. The air inducted to the air conduits 43, 44 in the turbine blades 9 and 10, is received at low pressure from the air entering tubes 9, but owing to the rapid rotation of the turbines, is compressed to a pressure approximately as high as the pressure of the gases of combustion entering the nozzle guide blade passages, and the structure should be designed with such compression in contemplation.

At the discharge side of the turbine 10 there is an annular chamber 45, to receive combustion gases discharged, and at the discharge side of the turbine 11 there is an annular chamber 46 to receive combustion gases discharged from that turbine. Both of these discharge chambers 45 and 46 discharge to the elongated discharge jet tube 47, the interior space of which discharges through the discharge port 48 to atmosphere, the discharge through the jet tube 47 being directed in a line extending radially from the axis of the tubular shaft 6 and its support shaft 3. The space of the jet tube 47 is separated from the adjacent part of the casing 32 by the wall 49, so that these discharge gases do not come into direct contact with the wall of the casing 32, but the latter is cooled by the air flowing inside of the casing 32.

Laterally exteriorly of the annular chambers 45, 46, there are formed air intake chambers 50 and 51, respectively, one adjacent one chamber 45 and the other adjacent the other chamber 46, the chambers being concentric with the axis of the tubular shaft 6 and surrounding the latter and delivering air to the intake end of the tube 9 adjacent to it. These intake chambers 50 and 51 are each in connection with the near end of one of the atmosphere induction channels 52 and 53, respectively, these channels constituting together the atmosphere air induction means of the two turbines and the compressor 7, the air flowing by way of annular intake chambers 50 and 51, to the common central air chamber 54 radially interiorly of the blades 7 of the compressor, some of the air being, however, by-passed by way of the air conduits in the turbine blades to the annular channels or chambers 37 and 38, respectively, for the blade cooling function. Two rectangular walls 55 and 56, vertically placed, in Figure 1, are at one end joined to the casing 32, at the latter's extreme ends, and these walls 55 and 56, are at their opposite ends, remote from the casing 32, and in forward part of the intake means, joined together, so that the two walls 55, 56, together form a dividing means for the air intake, placed to form a triangular or peaked division means between the induction channels 52 and 53.

The two walls 55, 56 thus divide the inducted atmospheric air into two streams, one passing to the tube 9 at one end and the other passing to the tube 9 at its opposite end. Each of the walls 55, 56, has mounted in it a fixed round shaft 57 and 58, respectively, and on these shafts there are oscillatively mounted, the two bearings 59 and 60, of shutter valves 61 and 62, respectively, the latter two valves, normally lying, as shown in Fig. 1, closely adjacent with the walls 55, 56, one outside of and adjacent to each. These shutter valves 61, 62 are normally held in the positions shown by the stream of atmospheric air passing by them to the compressor intake, but they are each constantly subjected to a light pull from the coil springs 63, and 64, so that when there is no passing air stream, the shutter valves 61, 62, will automatically close, but this closing is so lightly induced by the springs 63, 64, that the shutter valves 61, 62, will automatically move to the positions, as shown in Fig. 1, thus forming no obstruction to passage of atmospheric air into the compressor induction means. Stops 65, 66, are placed on the interior sides of the exterior induction channel walls 67, 68, so that the shutter valves 61, 62, will abut against these stops 65, 66, when placed in the closing positions. The walls 67, 68, form the exterior lateral outline of the air induction means and are formed as a rectangular frontal end, and thus form a rectangular front induction for the unit, by the intakes 52a, 53a.

Laterally exteriorly of the air intake chambers 50 and 51, one adjacent to each, there are formed annular air compression chambers 69 and 70, respectively, and these chambers have discharge through jet channels 71, 72, respectively, to atmosphere, and they have mounted within them, one in each, the compression rotors 73, 74, respectively, each of these compression rotors 73, 74, being formed with centrifugal compression blades 75, 76, and the rotors are mounted on the two extreme opposite ends of the tubular shaft 6, so that the shaft 6 will in rotation, rotate these compressor rotors 73, 74, with it, and at the same speed, and in rotation, will induct atmospheric air from the air intake channels 50, 51, and discharge the air at high speed into the discharge channels 71, 72, in the manner of by-pass air jet means, or as air from ducted blower means. The casing walls 77, 78, are secured rigidly to the exterior of the walls 67, 68, and the ports 79, 80, permit the passage of air to the compressors 73, 74, the air intake chambers 50, 51, being common to these compressor rotors and also to the intake means for the compressor 7.

The casing walls 77, 78, are, one at each extreme end of the jet casings and induction means, as described, that is at the extreme lateral ends, or sides, and one has the bearing 81 formed on it, and the other has the bearing 82, formed on it, and these two bearings are mounted to be oscillative on the ends of the support shaft 3, so that the support shaft 3 thus forms a mounting on which the entire turbine and compressor unit with its rotor means, may oscillate to either one of selected positions, as will be hereinafter described, and this oscillation will be procured and is controlled, by a spur gear 83 which is secured to one of these bearings 81, 82, so that by this spur gear 83 and the small spur gear 84, which is fixed on shaft 85, the bearing attached may be oscillated. The shaft 85 has also fixed on it, the worm wheel 86 which is in permanent engagement with the small worm 87, and the latter is on armature shaft 88 of the small electric motor 89, or any other type of motor means which may substitute for it. The shaft 85 is rotatable in a bearing bracket 90 which is formed on one of the two support bracket arms 2. The electric motor 89 is supplied with current by any current conduit, which may be of flexible type and placed to conduct current, as hereinafter described.

One end of the support shaft 3, has placed in it, and fixed in it, outside of the support bracket arm 2, an air conduit 91, which as hereinafter described, will, when desired for starting purposes, deliver air under pressure to a bore 92 formed in the support shaft 3, so that this starting air may be thereby passed under pressure to the ports 93 and thus to the central chamber 54 of the compressor 7, and will thereby pass to the turbines 10 and 11, for starting of the turbine and compressor shaft 6, and its attached means. In such starting phase, the shutter valves 61 and 62 are automatically shut, since there is as yet no suction on the air in the induction channels, and therefore, the springs 63, 64, pull the shutter valves into the closed positions, and therefore the air under pressure from the conduit 91 will not be permitted to escape by way of the air channels 52 and 53. The air conduit 91 will supply air under a pressure of say as much as fifty pounds per square inch or even more, from any turbine and compressor means which may be an auxiliary turbine and compressor stationed at any place in the aircraft, of which the unit is a part, and this may be the turbine-compressor unit T which may be located as at T in the aircraft shown diagrammatically in Figures 4 and 5. This starting air does not flow during normal operation, but only for starting of the particular unit and this air may be shut off by a hand valve 94 which is provided in each air conduit 91 for that purpose.

The auxiliary turbine unit T has a turbine driven shaft 95 which by any type of drive drives a fuel pump shaft 97 and this in turn drives the rotor of a fuel pump 98 which receives fuel from supply pipe 99 from any reservoir for fuel, and which discharges fuel through pipe 100 to the branch fuel pipes 101 which each deliver to the annular conduit 31 which is associated with any unit such as has been described and which is mounted on an aircraft. The aircraft shown in Figures 4 and 5, has four of the units, designated as A, A1, A2, and A3, each of which is a turbine unit such as has been described, as above, in connection with Figures 1, 2, and 3. The pump discharge pipe 100 may by-pass fuel through a bypass 102 to the fuel supply pipe 99, but this by-pass is automatically controlled by a by-pass valve 103 which shuts on the by-pass port 104 when the pressure of a coil spring 105, bearing on the pressure responsive piston 106, exceeds the pressure of fuel in the pipe 100 and therefore also exceeds the pressure of fuel in the fuel branch conduits 101. The pressure or compression of the spring 105 may be regulated by the member 107 which is adjustable in the threaded bracket 108. Thus the pressure of the fuel supplied to the branch pipes 101 and annular conduits 31 of the units A, etc., may be varied, as desired by the pilot for change of power output, but this pressure control means, should be designed or should be so controlled by the pilot, that the pressure will not exceed that which at any time will produce the maximum permitted speed of the rotor shaft 6 in the units A, etc., which speed should be predetermined for the units A, etc., and this pressure, so predetermined, should be that as will be required by the construction of the fuel nozzles 33 and 34. Each nozzle 33 and 34, has the construction, which is shown in Figure 6, including a so-called metering nozzle 109 which has a metering aperture 110. The metering apertures 110 of all nozzles of each unit, should be of a predetermined cross-sectional area of a very precisely measured and formed aperture, so that these metering apertures will in conjunction with the automatic pressure regulating means, as described, control the fuel flow so as not to permit any flow exceeding that flow to a turbine unit which will produce the maximum permitted speed of a turbine shaft 6. This automatic fuel pressure regulation, in connection with the metering apertures, will guard against excessive speed of any turbine shaft 6, but it may be noted, that any other type of speed regulating means, such as the governor means and fuel control means as usually provided in association with gas turbines, may also be provided in connection with shaft 6 and the fuel supply means, to prevent excessive speed, such means being not shown, for simplicity in the drawings, and because of the limited size of the figures.

The aircraft shown in Figures 4 and 5, as having four of the units, as described, will also have such control aelerons and horizontal and vertical rudders as are commonly included in aircraft construction, for horizontal flight control, and these are generally denoted as S, S1, S2, and will operate as they generally operate for control in aircraft. The units, designated as A, A1, A2, A3, will each be controlled by the fuel hand valves 111 whereby each unit A, A1 (A2, A3) may be separately controlled as to its fuel supply and accordingly as to its speed, and each such unit, will also be controlled as to direction of thrust from its discharge jet 47—48, by means of the electric motor 89 of each unit, the current thereto being controlled by a reversing switch 112 for each unit to control the direction of current in the field of the motor, and thus procure rotation in either direction of the motor shaft 88, and also the gears 86 and 84. By this reversal of direction, and rotation either way, the bearing 81 and with it the casing walls 77, 78, and the walls 67, 68 and the entire casing 32, wall 49 and jets 71 and 72 and jet tube 47 and the air induction means 52 and 53, are turned on the axis of the support shaft 3, into any position, varying from that as shown, in Figure 1 and Fig. 2, which is a horizontal position, with the jets and intake horizontally directed, to a position, which may be at right angles to the horizontal, or to a position at any angle between the horizontal and vertical, or to a position in which the jet tube 47 and jets 71, 72, are directed forwardly or nearly forwardly, that is oppositely to that shown. Since the worm 87 is small relative to worm wheel 86, and the angle of the worm 87 is relatively slight, this will serve to retain the casings in any position in which the casings are stationed by the motor 89. Any other means in addition may be used to securely fix the jet tubes and casings in any of the predetermined positions, as may be desired, but such additional means are not shown for simplicity in the drawings. Any braking means may be used in connection with the motor 89 and its shaft 88, for instance. Any indicating means to show the position of the jet tubes and casings may be provided, for the use of the pilot, but such means are not shown, and the pilot may be provided with such windows in the aircraft structure, that he may see the position occupied by the device, or any such devices, on his aircraft.

Having as above described in detail the construction of the device, its general operation is now described, with especial reference to Figures 1 and 2, and also Figures 4 and 5. Assuming that the units A, A1, A2, A3, are in the horizontal position, and inactive, the pilot will first cause ignition current to be passed to the spark plugs 35, 36 by means of any current supply means in the aircraft, such as a generator powered by the auxiliary turbine, or any storage battery, any flexible conductors providing for passage of the current. The pilot then, to start any one of the turbine units, opens the hand valve 94 associated with any air conduit 91. When air under pressure from the compressor T¹ of the turbine T, passes to the pipe 91, the pilot immediately turns on the fuel delivery to the associated unit, by adjusting the pressure of the automatic fuel control means, so that fuel is delivered to the annular conduit 31 and the nozzles 33, 34, of the unit. Air under the pressure of say fifty or more pounds, will now flow by way of pipe 91, ports 93, annular chamber 22, passages 16, 17, and nozzles 14, 15, to the turbines 10, and 11, and this air will flow at high pressure and velocity, and immediately commence rotation of the turbines 10, 11, and compressor 7, and fuel injected to the air stream by nozzles 33, 34, will ignite and commence heating of the air flow to increase the velocity and efficiency of the air. In this initial flow, the shutter valves 61, 62, are in the closed positions (dotted lines, Fig. 1), and air will not flow outwardly from channels 52, 53 (in reverse direction), so that the air under pressure is thus efficiently used for starting. As soon as the rotation of turbine shaft 6, is at a sufficiently high speed, which may be indicated to the pilot by any commonly known tachometer means, (not shown), the hand valves 94 may be closed, and the fuel flow may be increased, if desired, so that turbine shaft 6 rotates at high speed. Under the normal speed and condition, the shutter valves 61, 62 open by suction of the air inducted by compressor 7, and the valves 61, 62, move to the position shown by solid lines, Figure 1, and thereupon the turbine operates in its normal condition, and the flow through the turbine means, Figures 1, 2, is then as follows: Atmospheric air flows from intake ports 52a, 53a, through channels 52, 53, annular chambers 50, 51, through the opposite ends of the tubes 9, into the chamber 54, then through the channels between compressor blades 7, where the air is compressed to say seventy to 100 pounds, more or less, directed through passages of vanes 23, 27, 28, in three separate streams, one stream flowing to the annular chamber 22, through diffuser vanes 23, one stream flowing to the combustion chamber 18 through diffuser vanes 27, another stream flowing through diffuser vanes 28 to the combustion chamber 19. These streams of air under compression are at substantially the same air pressure. The air streams to the combustion chambers 18 and 19 are charged with fuel from the nozzles 33 and 34, respectively, and combustion takes place in those chambers. The air stream to chamber 22 divides into two annular streams to the annular passages 20 and 21 and these two streams pass, respectively, into the annular channels 16 and 17 where the air streams unite with the combustion products from the combustion chambers 18 and 19, and the combined streams then pass, one through the nozzle guide passages between nozzle guide blades 14 and the other through the nozzle guide passages between the nozzle guide blades 15, the streams passing from the nozzle guide blades pass to the turbine blades of the one turbine 10 from channel 16 and to the turbine blades of the other turbine 11 from the channel 17, the stream from one turbine 10 passing to annular chamber 45, and the stream from the other turbine 11 passing to the other annular chamber 46, both streams then passing to the jet tube 47 and through the discharge outlet 48 to atmosphere.

In the operation, there are other very small streams of air, each such small stream passing from the air stream which enters tubes 9, to the channels 43 or 44 respectively, there being one such channel in each turbine blade 10 or 11, and all these small streams are compressed by the centrifugal force from rotation of the turbines and the air as so compressed passes from the channels 43, 44, to the annular channels 37 and 38, respectively, and from the latter annular channels, the air passes to the channels 39 and 40, respectively, in the stator blades 14 and 15, and the air discharges from the latter channels, through the very small discharge apertures 41 and 42, where the air joins the combustion gas streams passing exteriorly of the stator blades 14 and 15, and passes with the combustion gas streams to the turbine blades, assisting in the impulsion thereof, and passes with the gas streams to the chambers 45, 46, and to the jet tube 47, and discharge 48.

The cooling air streams which enter channels 43 and 44 serve to cool the stator blades 14, 15, and also the turbine blades 10, 11, and thereby the stator and turbine blades are enabled to withstand higher temperatures of the combustion gas stream and the efficiency of the turbine means is improved. The turbine shaft 6, in its rotation, drives the compressors 73 and 74, and their blades 75 and 76, and these rotors then induct atmospheric air by way of the passages 79 and 80 from the chambers or channels 50 and 51, and this air is subjected to centrifugal force and the pressure increased and the blast of air is discharged through the jet tubes or passages 71 and 72, respectively, and by way of the eduction ports, 71a and 72a, to atmosphere, and with such velocity that the reactive force upon the turbine means adds to the propulsive thrust of the unit. While I have shown the channels 71, 72, 47 as separate, these air channels may be united into one discharging jet tube, if that be desired, in any construction. And it is contemplated that these air streams in jet tubes 71, 72, may be charged with fuel for combustion, to increase power output, as a jet thrust means, by means of the fuel nozzles F, these nozzles being supplied with fuel in any maner such as that means which supplies the nozzles 33, 34, but this fuel means is not shown, specifically. It is contemplated that such fuel supply to nozzles F, need not be included in the construction, and it is also contemplated that the blowers or compressors 73, 74, and blades 75, 76, and tubes 71, 72, may be eliminated from any construction, and the other air compressing and combustion and turbine means, alone be used. Such elimination, may be the case, in such constructions, where simplicity is especially desired, in the manufacture, and especially in constructions as where the turbine and compressor means is used for the creation of a gas stream under pressure for another power turbine unit, that is where it is used as a gas generator means for a power unit.

The combustion chambers 18 and 19 may be extended in size and length of passage, in any manner, if that be desired in any construction. The fuel branch conduits 101, to annular conduit 31, of any turbine unit, in an installation, is contemplated to have a flexible section 101a, which is at the location of the casing 32 and serves to permit flexing in turning of the casing and jet structure by the bearings 81, 82, on the shaft 3, for the change of thrust direction of the jet means. Any supply is applicable. When the pilot desires to change the direction of thrust of the units on his aircraft, he by reverse switch 112 and switch X, causes current to be supplied to the electric motor 89, and to turn the shaft and the jet means, as he desires. He may station all the jet means of the units, A, A1, A2, A3, in the vertical positions as indicated by dotted lines, Figures 4 and 5, so that their jet discharges are directed downwardly, and thereby the jets will serve to provide vertical sustentation, upwardly, for the aircraft, instead of horizontal propulsion. And conversely, by switches 112, he may cause the units to resume the horizontal positions, as indicated by the solid lines in the figures, and thereupon the jets will discharge rearwardly of the aircraft and furnish horizontal forward propulsion for the aircraft, and the pilot may cause the jet discharges to be directed forwardly of the aircraft, and horizontally or nearly horizontally, and to thus furnish braking thrust for the aircraft in landing operations. The compressors 73, 74, may be designed to compress the air, inducted thereby and compressed thereby, to any pressure, high or low, which will best utilize the power supplied to them with efficiency to produce jet thrust in the associated jet channels or tubes. Current conductor C is provided.

The tubular shaft 6 is shown as mounted rotatably on the support shaft 3 without any intermediary ball or roller type bearings, but it should be noted, that any such means as ball or roller bearings, as are commonly used, may be placed between the rotor shaft 6 and the support shaft 3 to procure the most frictionless rotation of the turbine and compressing means. The support shaft 3 is not necessarily a part of the construction, as shown, but the turbine and compressor rotor means may be mounted for rotation by any type of bearing means mounting the rotor means axially of the casing means shown, so that the rotation as shown may be effected, the mounting shown being a mounting which it is contemplated to give firm and strong support to the rotor means, in its rotation. Spark plugs 113 may be provided.

While I have shown particular devices and combinations of devices in the illustration of my invention, I contemplate that other detailed devices and combinations of devices may be adopted in the realization of my invention without departing from the spirit and contemplation thereof.

What I claim is:

1. In a turbo-jet means: a casing unit having an atmospheric air intake tube open at one end to receive air and a discharge jet tube open at one end and directed to discharge gases in substantially the same direction as there is entry of air to said air intake tube; a rotor casing mounted to be within the space interiorly of said tubes and to have its axis perpendicular to the longitudinal axis of said tubes; a rotor shaft means mounted by bearing means supported with the rotor casing and to be rotatable on an axis substantially coincidental with the axis of said rotor casing; a pair of turbine rotors mounted on said rotor shaft means to be rotatable therewith and having each turbine blade fixed annularly thereon and a centrifugal compressor fixed on said rotor shaft means intermediately of said pair of turbine rotors; the turbine rotors having each air induction passage means radially inwardly thereof and through which air may pass from said atmospheric air intake tube to the said centrifugal compressor; a combustion chamber formed with said rotor casing and by which air under compression may pass from said centrifugal compressor to blades of each of said turbine rotors; a pair of exhaust chambers formed adjacent the axial ends of said rotor casing and by which exhaust gases pass from both turbine rotors to said discharge jet tube; means to deliver fuel for combustion to said combustion chamber; the said rotor casing having attached to it and extending forwardly from it and into said air intake tube a wedge shaped air-directing means located intermediately of the transverse width of said air intake tube to thereby channel inducted air into two streams each of which passes to one of said air induction passage means; a pair of shutters each of which is hinged to and substantially at the apex of said wedge shaped air-directing means to be movable thereon to a position blocking air flow and alternatively to a position permitting free conduction of air on one side of said air-directing means; means to supply starting air under pressure to said combustion chamber to supply air for initial rotation of said rotor shaft means and its affixed rotors.

2. In a turbo-jet means: a casing unit having an atmospheric air intake tube open at one end to receive air and a discharge jet tube open at one end and directed to discharge gases in substantially the same direction as there is entry of air to said air intake tube; a rotor casing mounted to be within the space interiorly of said tubes and to have its axis perpendicular to the longitudinal axis of said tubes; a rotor shaft means mounted by bearing means supported with the rotor casing and to be rotatable on an axis substantially coincidental with the axis of said rotor casing; a pair of turbine rotors mounted on said rotor shaft means to be rotatable therewith and having each turbine blade fixed annularly thereon and a centrifugal compressor fixed on said rotor shaft means intermediately of said pair of turbine rotors; the turbine rotors having each air induction passage means radially inwardly thereof and through which air may pass from said atmospheric air intake tube to the said centrifugal compressor; a combustion chamber formed with said rotor casing and by which air under compression may pass from said centrifugal compressor to blades of each of said turbine rotors; a pair of exhaust chambers formed adjacent each axial end of said rotor casing and by which exhaust gases pass from both turbine rotors to said discharge jet tube; means to deliver fuel for combustion to said combustion chamber; the said bearing means by which said rotor shaft means is rotatably mounted being further defined as a relatively static cylindrical shaft placed axially of said rotor shaft means and in bearings axially coincident with said rotor shaft means and formed in each of the opposite lateral sides of said casing unit; and a fixture support means at each end of said relatively static cylindrical shaft; the latter thereby providing support for said casing unit and its included rotor casing.

3. The device as defined in claim 2 and: a pair of ducted air blowers one at each end of said rotor shaft means and rotative thereby; each said ducted air blower having a connection for air entry thereto from said atmospheric air intake tube; each said ducted air blower having a discharge therefrom to air ejection means laterally exteriorly of said discharge jet tube and discharging substantially parallel in direction to discharge from said discharge jet tube.

References Cited in the file of this patent
UNITED STATES PATENTS

| | | |
|---|---|---|
| 981,978 | Coleman | Jan. 17, 1911 |
| 1,276,260 | Parrish | Aug. 20, 1918 |
| 1,726,104 | Harris | Aug. 27, 1929 |
| 2,168,726 | Whittle | Aug. 8, 1939 |
| 2,336,232 | Doran | Dec. 7, 1943 |
| 2,621,871 | Robert | Dec. 16, 1952 |
| 2,626,501 | Pavlecka et al. | Jan. 27, 1953 |
| 2,668,026 | Price | Feb. 2, 1954 |
| 2,677,931 | Prieto | May 11, 1954 |
| 2,679,991 | Eagon | June 1, 1954 |
| 2,762,584 | Price | Sept. 11, 1956 |